(12) United States Patent
Wake et al.

(10) Patent No.: US 6,383,244 B1
(45) Date of Patent: May 7, 2002

(54) FILTER WITH RETAINED SAFETY ELEMENT

(75) Inventors: Jon S. Wake, Verona; Donald E. Stiemke; James A. Bass, both of Madison; Mark V. Holzmann, Stoughton; Paul B. Rear, McFarland, all of WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/692,976

(22) Filed: Oct. 20, 2000

(51) Int. Cl.$^7$ .......................... B01D 29/58; B01D 35/30
(52) U.S. Cl. .............. 55/482; 55/498; 55/502; 55/507; 55/509; 55/510; 55/521
(58) Field of Search .................. 55/482, 502, 498, 55/503, 505, 507, 510, 521, 509

(56) References Cited

U.S. PATENT DOCUMENTS

| | | |
|---|---|---|
| 2,599,604 A | 6/1952 | Bauer |
| 2,962,121 A | 11/1960 | Wilber |
| 3,147,100 A | 9/1964 | Wilber |
| 3,160,488 A | 12/1964 | Wilber |
| 3,334,753 A | 8/1967 | Royer |
| 3,494,114 A * | 2/1970 | Nelson et al. ............... 55/482 |
| 4,065,341 A | 12/1977 | Cub |
| 4,135,899 A * | 1/1979 | Gauer ....................... 210/338 |
| 4,157,902 A | 6/1979 | Tokar |
| 4,310,419 A | 1/1982 | Nara |
| 4,589,983 A | 5/1986 | Wydevan |
| 4,634,527 A | 1/1987 | Marshall |
| 4,720,292 A | 1/1988 | Engel |
| 4,878,929 A | 11/1989 | Tofsland et al. |
| 5,106,397 A | 4/1992 | Jaroszczyk |
| 5,167,683 A | 12/1992 | Behrendt et al. |
| D342,990 S | 1/1994 | Jaroszczyk |
| 5,275,636 A | 1/1994 | Dudley et al. |
| 5,415,677 A | 5/1995 | Ager et al. |
| 5,431,706 A | 7/1995 | Paas |
| 5,484,466 A | 1/1996 | Brown et al. |
| 5,487,767 A | 1/1996 | Brown |
| 5,547,480 A | 8/1996 | Coulonvaux |
| 5,549,722 A | 8/1996 | Zemaitis et al. |
| 5,556,440 A | 9/1996 | Mullins et al. |
| 5,562,825 A | 10/1996 | Yamada |
| 5,601,626 A | 2/1997 | Hori et al. |
| 5,601,717 A | 2/1997 | Villette et al. |
| 5,605,625 A | 2/1997 | Mills |
| 5,632,791 A | 5/1997 | Oussoren et al. |
| 5,669,949 A | 9/1997 | Dudrey et al. |
| 5,674,393 A | 10/1997 | Terhune |
| 5,685,985 A | 11/1997 | Brown et al. |
| 5,693,109 A | 12/1997 | Coulonvaux |
| 5,725,624 A | 3/1998 | Ernst et al. |

(List continued on next page.)

FOREIGN PATENT DOCUMENTS

| | | |
|---|---|---|
| DE | 3001674 | 7/1981 |
| DE | 3405719 | 8/1985 |
| FR | 1131647 | 10/1956 |
| FR | 2261041 | 12/1975 |
| GB | 1499922 | 2/1978 |
| GB | 2110110 | 6/1983 |

*Primary Examiner*—Robert A. Hopkins
(74) *Attorney, Agent, or Firm*—Andrus, Sceales, Starke & Sawall, LLP

(57) ABSTRACT

A filter (10) has a housing (12) extending along an axis (18) between first and second axial ends (20 and 22), and has a closed loop primary filter element (24) extending axially in the housing, and a closed loop safety filter element (48) in the hollow interior (30) of the primary filter element. A detent member (60) engages and retains the end cap (54) of the safety filter element independently of the primary filter element to retain the safety filter element in housing upon removal of the primary filter element from the housing.

11 Claims, 2 Drawing Sheets

U.S. PATENT DOCUMENTS

| | | |
|---|---|---|
| 5,730,769 A | 3/1998 | Dungs et al. |
| 5,741,421 A | 4/1998 | Erdmannsdoerfer |
| 5,755,842 A | 5/1998 | Patel et al. |
| 5,755,843 A | 5/1998 | Sundquist |
| 5,797,973 A | 8/1998 | Dudrey et al. |
| 5,800,581 A | 9/1998 | Gielink et al. |
| 5,863,313 A | 1/1999 | Coulonvaux |
| 5,893,937 A | 4/1999 | Moessinger |
| 6,099,606 A | 8/2000 | Miller et al. |
| 6,149,700 A | 11/2000 | Morgan et al. |

\* cited by examiner

FILTER WITH RETAINED SAFETY ELEMENT

BACKGROUND AND SUMMARY

The invention relates to fluid filters, and more particularly to filters having a safety or secondary filter element in addition to a primary or main filter element.

Many heavy duty engine air cleaner applications use a safety or secondary filter element to provide extra protection for the engine from dust or debris contamination either through failure of the primary filter element, or while servicing the primary filter element. It is desirable that the safety filter element remains intact and maintains its seal in the air cleaner housing to protect the engine from contaminants while servicing the primary filter element. The present invention addresses and solves this need in a particularly simple and effective manner.

DETAILED DESCRIPTION

Figure 1:
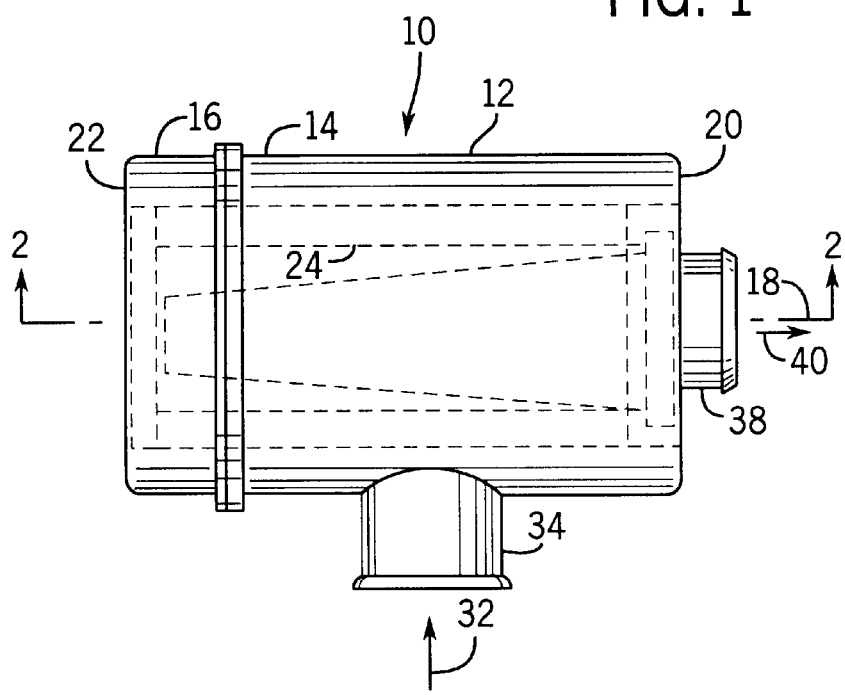
FIG. 1 is a side elevation view of a filter in accordance with the invention.
Figure 2:
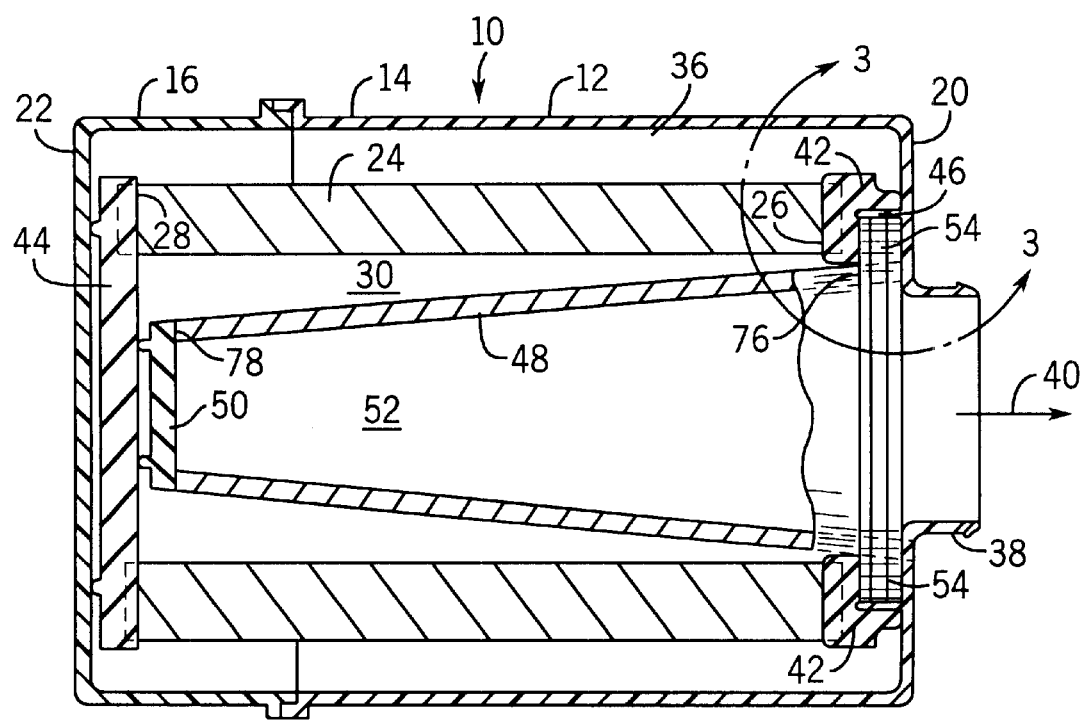
FIG. 2 is a sectional view taken along line 2—2 of FIG. 1.

FIGS. 1 and 2 show a filter 10 having a housing 12 including a base 14 and a cover 16 and extending along an axis 18 between first and second axial ends 20 and 22. A closed loop primary or main filter element 24 extends axially in the housing between first and second axial ends 26 and 28 respectively adjacent first and second axial ends 20 and 22 of the housing. Primary filter element 24 is typically annular, though other shapes are possible such as oval. Primary filter element 24 has a hollow interior 30. Dirty air as shown at arrow 32 enters housing inlet 34 and flows into annular space 36 and then radially inwardly through filter element 24 into hollow interior 30 and then flows axially rightwardly in FIGS. 1 and 2 and exits housing outlet 38 as shown at clean air arrow 40. Filter element 24 is typically pleated filter media potted in soft compressible urethane end caps 42 and 44 at respective axial ends 26 and 28 and axially compressed in sealing relation in the housing to prevent bypass of dirty air from annular space 36 into hollow interior 30. End cap 44 spans hollow interior 30 to close the leftward axial end of the filter element. End cap 42 is additionally radially compressed against flange 46 extending axially leftwardly from axial end 20 of the housing, such that end cap 42 is both axially and radially compressed in sealing relation with the housing.

Figure 3:
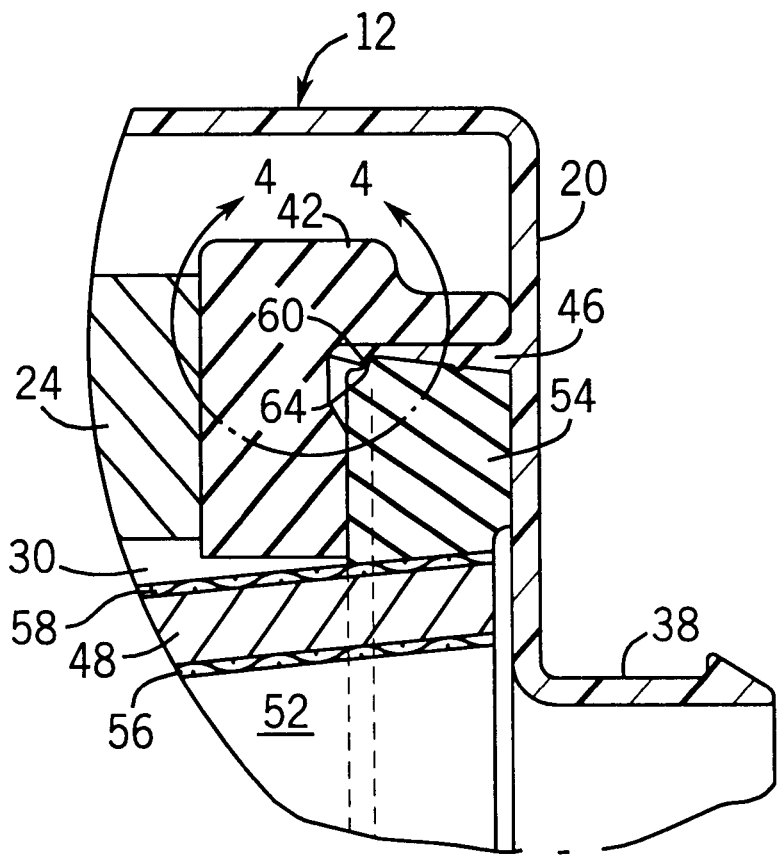
FIG. 3 is an enlarged view of a portion of FIG. 2 at section 3—3.
Figure 4:
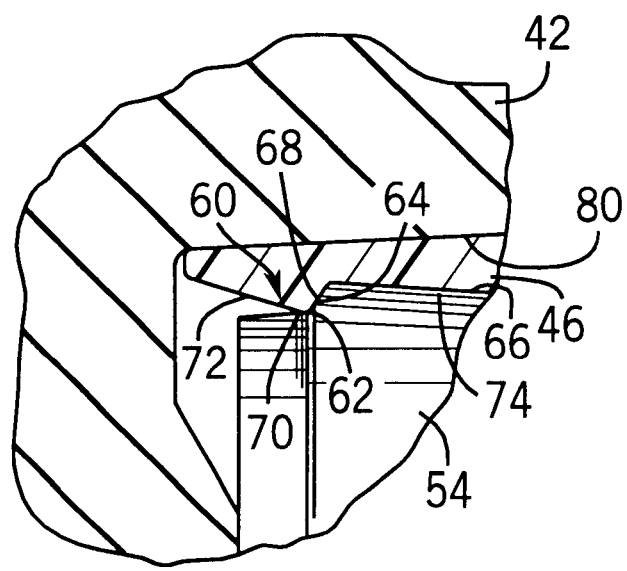
FIG. 4 is an enlarged view of a portion of FIG. 3 at section 4—4.

A closed loop safety or secondary filter element 48 is provided in hollow interior 30 of primary filter element 24. Safety filter element 48 has a leftward axial end cap 50 spanning and closing hollow interior 52 of safety filter element 48. Safety filter element 48 has a rightward annular end cap 54, FIG. 3, at rightward axial end 20 of the housing and radially compressed against flange 46 in sealing relation. Safety filter element 48 is preferably conical and formed of pleated filter media or fibrous media between inner and outer liners 56 and 58, FIG. 3. Axial end 20 of housing 12 has a detent member 60 on flange 46, FIGS. 3, 4, engaging and retaining end cap 54 independently of primary filter element 24 to retain safety filter element 48 in housing 12 upon removal of primary filter element 24 from the housing. Cover 16 is mounted to base 14 in standard manner, as by overcenter clamps, bayonet couplings, or the like, as is known. Cover 16 is removed from base 14 to gain access to primary filter element 24 to enable removal and servicing and/or replacement thereof. During removal of primary filter element 24, it is desired that safety filter element 48 remain in place in the housing, including its sealed relation against housing end 20, to protect downstream engine components.

Detent member 60 on flange 46 has a ridge or bump 62 extending radially toward safety filter element 48. End cap 54 has a shoulder 64 engaging ridge 62 in interference fit to prevent or at least hinder axial removal of safety filter element 48 from housing 12. Flange 46 is an annular axial projection spaced radially outwardly of and circumscribing safety filter element 48. Flange 46 has an inner sealing surface 66 extending axially from end 20 of the housing toward ridge 62. End cap 54 is radially compressed in sealing relation between outer liner 58 of safety filter element 48 and sealing surface 66. Ridge 62 has an engagement surface 68 extending from sealing surface 66 axially leftwardly and radially inwardly toward safety filter element 48 to an inner lip 70. Engagement surface 68 faces radially inwardly and axially rightwardly toward right axial end 20 of the housing. Ridge 62 has a tapered surface 72 extending from inner lip 70 radially outwardly and axially leftwardly toward left axial end 22 of the housing. End cap 54 has a sealing surface 74 extending axially from right axial end 20 of the housing toward shoulder 64. Sealing surface 74 of end cap 54 extends along and sealingly engages inner sealing surface 66 of flange 46. Shoulder 64 extends from sealing surface 74 axially leftwardly and radially inwardly toward safety filter element 48. Shoulder 64 faces radially outwardly and axially leftwardly toward left axial end 22 of the housing. Sealing surface 74 of the end cap slides along tapered surface 72 of ridge 62 and past inner lip 70 during rightward axial insertion of safety filter element 48 into housing 12. Engagement surface 68 and inner lip 70 lie in the path of movement of shoulder 64 upon attempted leftward axial withdrawal of safety filter element 48 from housing 12.

Safety filter element 48 extends axially between right and left axial ends 76 and 78, FIG. 2, proximate respective right and left axial ends 26 and 28 of primary filter element 24. Safety filter element 48 is tapered to a narrower lateral width at end 78 relative to end 76 to provide lateral clearance between left end 78 of the safety filter element and left end 28 of the primary filter element in hollow interior 30 of the primary filter element to permit lateral rocking back and forth of left end 28 of primary filter element 24 during removal thereof, without dislodging safety filter element 48.

Detent 60 and flange 46 provide a combined retention detent and sealing flange extending from right end 20 of the housing axially toward left end 22 of the housing. The combined retention detent and sealing flange is radially between end cap 54 of safety filter element 48 and end cap 42 of primary filter element 24. Flange 46 circumscribes hollow interior 30. The flange has the noted inner sealing surface 66, FIG. 4, facing radially inwardly toward hollow interior 30 and engaging end cap 54 of safety filter element 48 in radially compressive sealing relation. The flange has an outer sealing surface 80 facing radially away from hollow interior 30 and engaging end cap 42 of primary filter element 24 in radially compressive sealing relation. Detent 60 is formed on inner sealing surface 66 of the flange and engages and retains end cap 54 of safety filter element 48 in interference fit independently of end cap 42 of primary filter element 24 to retain safety filter element 24 in housing 12 upon axial withdrawal of primary filter element 24 from the housing.

End caps 26 and 28 of primary filter element 24 and end caps 54 and 50 of safety filter element 48 are formed of soft compressible elastomer material such as urethane. When it is time to remove and replace safety filter element 48, the safety filter element is pulled axially leftwardly with enough force to radially compress shoulder 64 past inner lip 70.

It is recognized that various equivalents, alternatives and modifications are possible within the scope of the appended claims.

What is claimed is:

1. A filter comprising a housing extending along an axis between first and second axial ends, a closed loop primary filter element extending axially in said housing between first and second axial ends respectively adjacent said first and second axial ends of said housing, said primary filter element having a hollow interior, a closed loop safety filter element in said hollow interior of said primary filter element, said safety filter element having an end cap at said first end of said housing, said first end of said housing having a detent member engaging and retaining said end cap independently of said primary filter element to retain said safety filter element in said housing upon removal of said primary filter element from said housing.

2. The invention according to claim 1 wherein said detent member comprises a flange extending axially into said housing from said first end of said housing, said flange having a ridge extending radially toward said safety filter element, said end cap having a shoulder engaging said ridge in interference fit to hinder axial removal of said safety filter element from said housing.

3. The invention according to claim 2 wherein said flange is spaced radially outwardly of and circumscribes said safety filter element, said flange has a sealing surface extending axially from said first end of said housing toward said ridge, said end cap is radially compressed in sealing relation between said safety filter element and said sealing surface.

4. The invention according to claim 3 wherein said ridge has an engagement surface extending from said sealing surface radially inwardly toward said safety filter element to an inner lip, said engagement surface faces axially toward said first end of said housing, said ridge has a tapered surface extending from said inner lip radially outwardly and axially toward said second end of said housing, said end cap has a sealing surface extending axially from said first end of said housing toward said shoulder, said sealing surface of said end cap extends along and sealingly engages said sealing surface of said flange, said shoulder extends from said sealing surface of said end cap radially inwardly toward said safety filter element, said shoulder faces axially toward said second end of said housing, wherein said sealing surface of said end cap slides along said tapered surface of said ridge and past said inner lip of said ridge during axial insertion of said safety filter element into said housing, and wherein said engagement surface and said inner lip of said ridge lie in the path of movement of said shoulder upon attempted axial withdrawal of said safety filter element from said housing.

5. The invention according to claim 1 wherein said safety filter element extends axially between first and second axial ends respectively proximate said first and second axial ends of said primary filter element, said safety filter element is tapered to a narrower lateral width at said second end relative to said first end to provide lateral clearance between said second end of said safety filter element and said second end of said primary filter element in said hollow interior of said primary filter element to permit lateral rocking back and forth of said second end of said primary filter element during removal thereof, without dislodging said safety filter element.

6. A filter comprising a housing extending along an axis between first and second axial ends, a closed loop primary filter element extending axially in said housing between first and second axial ends respectively adjacent said first and second axial ends of said housing, said primary filter element having a hollow interior, a closed loop safety filter element in said hollow interior of said primary filter element, said safety filter element having an end cap at said first end of said housing, said primary filter element having an end cap at said first end of said housing, a combined retention detent and sealing flange extending from said first end of said housing axially toward said second end of said housing and being radially between said end cap of said safety filter element and said end cap of said primary filter element.

7. The invention according to claim 6 wherein said flange circumscribes said hollow interior, said flange has an inner sealing surface facing radially inwardly toward said hollow interior and engaging said end cap of said safety filter element in radially compressive sealing relation, said flange has an outer sealing surface facing radially outwardly away from said hollow interior and engaging said end cap of said primary filter element in radially compressive sealing relation.

8. The invention according to claim 7 wherein said detent is formed on said inner sealing surface of said flange and engages and retains said end cap of said safety filter element in interference fit independently of said end cap of said primary filter element to retain said safety filter element in said housing upon axial withdrawal of said primary filter element from said housing.

9. The invention according to claim 8 wherein said detent comprises a ridge extending radially toward said safety filter element, and wherein said end cap of said safety filter element has a shoulder engaging said ridge in interference fit to hinder axial removal of said safety filter element from said housing.

10. The invention according to claim 9 wherein said ridge has an engagement surface extending from said inner sealing surface of said flange axially toward said second end of said housing and radially inwardly toward said safety filter element to an inner lip, said engagement surface faces radially inwardly and axially toward said first end of said housing, said ridge has a tapered surface extending from said inner lip radially outwardly and axially toward said second end of said housing, said end cap of said safety filter element has a sealing surface extending axially from said first end of said housing toward said shoulder, said sealing surface of said end cap of said safety filter element extends along and sealingly engages said inner sealing surface of said flange, said shoulder extends from said sealing surface of said end cap of said safety filter element axially toward said second end of said housing and radially inwardly toward said safety filter element, said shoulder faces radially outwardly and axially toward said second end of said housing, wherein said sealing surface of said end cap of said safety filter element slides along said tapered surface of said ridge and past said inner lip during axial insertion of said safety filter element into said housing, and wherein said engagement surface and said inner lip lie in the path of movement of said shoulder upon attempted axial withdrawal of said safety filter element from said housing.

11. A filter comprising a housing extending along an axis between first and second axial ends, a closed loop primary filter element extending axially in said housing between first and second axial ends respectively adjacent first and second axial ends of said housing, said primary filter element having a hollow interior, a closed loop safety filter element in said hollow interior of said primary filter element, said safety filter element having an end cap at said first end of said housing, said primary filter element having an end cap at said first end of said housing, a sealing flange extending from said first end of said housing axially toward said second end of said housing and being radially between said end cap of said safety filter element and said end cap of said primary filter element, said flange circumscribing said hollow interior, said flange having an inner sealing surface facing radially inwardly towards said hollow interior and engaging said end cap of said safety filter element in radially compressive sealing relation, said flange having an outer sealing surface facing radially outwardly away from said hollow interior and engaging said end cap of said primary filter element in radially compressive sealing relation, said safety filter element extending axially between first and second axial ends respectively proximate said first and second axial ends of said primary filter element, wherein said safety filter element is tapered to a narrower lateral width at said second end relative to said first end to provide lateral clearance between said second end of said safety filter element and said second end of said primary filter element in said hollow interior of said primary filter element to permit lateral rocking back and forth of said second end of said primary filter element during removal thereof, without dislodging said safety filter element, and wherein said flange has a detent engaging and retaining said end cap of said safety filter element in interference fit independently of said primary filter element to retain said safety filter element in said housing upon removal of said primary filter element from said housing.

\* \* \* \* \*